United States Patent
Wilson et al.

(10) Patent No.: US 12,297,874 B2
(45) Date of Patent: May 13, 2025

(54) COATED DRIVER AND METHOD OF FORMING

(71) Applicant: Morrison Timing Screw Co., Glenwood, IL (US)

(72) Inventors: Nick Lynn Wilson, Downers Grove, IL (US); Ryan Finke, Chicago, IL (US); Caleb J. Knepper, Dyer, MI (US)

(73) Assignee: Morrison Timing Screw Co., Glenwood, IL (US)

( * ) Notice: Subject to any disclaimer, the term of this patent is extended or adjusted under 35 U.S.C. 154(b) by 627 days.

(21) Appl. No.: 17/508,088

(22) Filed: Oct. 22, 2021

(65) Prior Publication Data

US 2023/0098325 A1   Mar. 30, 2023

Related U.S. Application Data

(60) Provisional application No. 63/261,703, filed on Sep. 27, 2021.

(51) Int. Cl.
   *F16D 1/08*      (2006.01)
   *F16D 3/68*      (2006.01)

(52) U.S. Cl.
   CPC ............ *F16D 3/68* (2013.01); *F16D 1/0894* (2013.01); *F16D 2200/0021* (2013.01); *F16D 2200/0056* (2013.01); *F16D 2300/12* (2013.01); *Y10T 403/7091* (2015.01)

(58) Field of Classification Search
   CPC .. F16D 3/68; F16D 1/0894; F16D 2200/0021; F16D 2200/0056; F16D 2300/12; Y10T 403/7091

USPC ............. 403/347, 379.6; 411/431, 512, 536; 16/108
   See application file for complete search history.

(56) References Cited

U.S. PATENT DOCUMENTS

| | | | | |
|---|---|---|---|---|
| 4,907,929 | A  * | 3/1990 | Johnston, Jr. ........... | F16B 37/14 411/431 |
| 7,445,555 | B2 * | 11/2008 | Gross ....................... | F16D 3/28 |
| 8,186,691 | B2 * | 5/2012 | Baxi ..................... | F16L 23/167 |

FOREIGN PATENT DOCUMENTS

| | | | | |
|---|---|---|---|---|
| DE | 3401 426 A1 | * | 7/1985 | ..................... 403/347 |
| FR | 1.399.355 | * | 4/1965 | ..................... 403/347 |
| GB | 944695 | * | 12/1963 | ..................... 464/87 |

* cited by examiner

*Primary Examiner* — Greg Binda
(74) *Attorney, Agent, or Firm* — Quinn IP Law

(57) ABSTRACT

A driver for coupling a driving device and a driven device includes a core defining a plurality of corner chamfers and a casing formed on and encasing the core. The casing has a contoured perimeter surface and a variable casing thickness, and is compressible during an interference fit installation to a coupling socket to provide a non-lubricated coupling which has zero backlash and substantially no running noise. The core is made of a metal-based material and includes a shaft bore for receiving an input shaft. In an illustrative example, the driver core is made of a stainless steel core and the casing is made of a high wear thermoset urethane material. The metal core can be recycled from the coated driver by removal of the polymeric casing, then recoated with a new casing to form a new coated driver including the recycled metal core.

16 Claims, 11 Drawing Sheets

VIEW E-E

SECTION A-A

SECTION B-B

SECTION C-C

SECTION D-D

COATED DRIVER AND METHOD OF FORMING

CROSS-REFERENCE TO RELATED APPLICATION

This application claims a priority to U.S. Provisional Patent Application No. 63/261,703 filed on Sep. 27, 2021, the disclosure of which is incorporated in its entirety by reference herein.

TECHNICAL FIELD

The present disclosure pertains to a driver for coupling a driving device to a driven device, and specifically, to a coated driver and method for forming a coated driver.

BACKGROUND

Drive coupling systems are used to couple a driving device such as a motor, to a driven device such as a timing screw, gear box, or other rotating device. A known configuration of drive coupling system includes a metal driver which includes a shaft bore to receive an input shaft of the driving device, and a socket coupling including a socket cavity to receive the metal driver. The socket coupling is operatively connected to the driven device, such that when the driver is inserted into the socket cavity and rotated by the driving device, rotational force is transmitted through a drive interface defined by a perimeter surface of the driver (drive surface) and a socket surface forming the socket cavity (coupling surface) to drive rotation of the driven device.

In a known configuration, a metal driver having a rounded square perimeter surface is coupled with a metal socket cavity having a square or rounded square coupling surface. The perimeter surface of the metal driver is sized to the coupling surface of the socket cavity to provide clearance for insertion of the metal driver into the socket, which at a minimum has a greater than zero clearance to provide a slip fit clearance between the driver perimeter surface and the socket coupling surface. A lubricant or grease can be applied to the perimeter surface of the metal driver and/or in the metal socket cavity, to decrease wear between the components and/or reduce running noise. At the start of rotation of the driver, the driver rotates until corners of the driver perimeter surface make contact with and engage the coupling surface of the socket, at which time the driver in contact with the socket initiates rotation of the socket coupling and the driven device attached to the socket coupling. Clearance between the metal driver and the socket coupling surface at the start and stop of rotation causes backlash in the system, including, for example, backlash in a timing screw connected to the socket coupling. Further, contact of the driver with the socket during take-up of the clearance generates running noise, such as clicking, during start, stop, indexing, and intermittent motion of the coupling system. During rotation of the coupling system, rotational force is transferred from the driving device to the driven device via the coupling socket primarily by contact of the corners of the metal driver with the socket coupling surface, such that, due to the concentrated loading of the corners and repetitive intermittent contact with the socket coupling surface over time, the corners of the metal driver are subject to wear. Wear at the corners of the metal driver increases the clearance between the driver and socket coupling surface, increases backlash, and increases running noise, necessitating removal and replacement of the worn driver when the clearance increases to a maximum acceptable level. Over time in use, the lubricant may need to be replaced or replenished, for example, due to breakdown of the lubricant and/or contaminants introduced to and retained by the lubricant is use. Downtime of a coupling system including the metal driver can be incurred for one or more of periodic lubrication (greasing) of the metal driver during use, inspection of the metal driver for wear, measurement of the change in clearance level resulting from driver wear, and/or removal and replacement of the metal driver when worn beyond useful life. Typically, a worn metal driver cannot be reworked, such that the worn metal driver must be disposed of or scrapped. In a system including a timing screw, driver wear and increasing backlash may also affect timing screw performance, for example, due to timing screw acceleration during take-up of the backlash, particularly in applications requiring indexing, stop-start cycling and/or other intermittent operation of the timing screw.

SUMMARY

A drive coupling system which includes a coated driver for coupling a driving device such as a motor, to a driven device such as a timing screw, gear box, etc. is described herein, where in an illustrative example the coated driver transmits a rotational force from the driving device through a socket coupling connected to the driven device. The coated driver includes a core member, referred to herein as a core, and a casing which encases and is adhered to the exterior surfaces of the core member. The casing is made of a polymeric material and is formed as a single integral casing which defines a continuous perimeter drive surface of the core member. The perimeter drive surface is contoured as further described herein, and such that the casing has a variable thickness relative to the exterior surfaces of the core. The core, which in an illustrative example is made of a metal-based material, includes a shaft bore to receive an input shaft of the driving device, and a pin bore to receive a coupling pin. In a non-limiting example, the casing of the coated driver has a rounded square perimeter surface including rounded square and convex corner portions, for coupling with a metal socket cavity having a square or rounded square coupling surface. The uninstalled width of the coated driver is slightly larger than the width of the socket cavity, such that, when installed to the coupling socket, the casing is compressed to provide an interference fit between the coated driver and the coupling surface of the socket cavity, the interference fit defining a contact interface between the casing and the socket. The compression of the casing and the resulting interference fit advantageously results in a zero clearance connection between the coated driver and the socket, such that when a rotational force is applied to the coated driver, the coated driver transfers a corner force component of the rotational force to the coupling socket via the casing corner portions, and transfers an interface force component FI of the rotational force to the coupling socket across the contact interface, with zero backlash. Further, because the casing is maintained in contact with the coupling surface of the socket at all times, due to the interference fit, there is no clearance to take-up during starting and stopping of rotation of the driver, such that the coupling does not generate any running noise, providing for quiet or near silent operation during indexing, stop-start cycling and/or other intermittent operation of the driven device, which may be, for example, a timing screw. By distributing transmission of the rotational force between a corner force component FC of the rotational force transmitted through the casing corner portion and an interface force component FI transmitted through the side and pin portions of the casing, point loading of the corner portions is decreased relative to the corner loading imposed on the metal corners of an uncoated metal driver, thus substantially reducing wear at the contact interface between the coated driver and the coupling surface, and extending the useful life of the coated driver.

The coated driver described herein is advantaged by a relatively longer life as compared with an uncoated metal driver, due to the differences in rotational force transfer between the coated driver and the coupling socket. Because the casing of the coated driver is maintained in contact with the coupling surface over a contact interface of substantially larger area than the corner contact of the uncoated metal driver, the rotational force is distributed across the contoured perimeter surface of the casing, decreasing wear. Further, as detailed herein, the corner portions of the casing are compressed during the start of rotation, damping the contact force such that the contact force is not directly applied to the metal core member. In the examples described herein, the corners of the metal core are chamfered such that corner contact force transmitted through the corner portion of the casing is distributed across the corner chamfer of the metal core to increase the durability of the coated driver, as compared with the durability of an uncoated metal driver. Over time, wear may occur at the casing corners and in the contact interface extending along the side portions of the casing, such that over time, a slight clearance can develop between the driver casing and the socket coupling surface, such that the coated driver can be slipped from the socket cavity, providing an apparent visual indicator that the coated driver has worn to a point where replacement of the coated driver should be considered. Advantageously, the wear and clearance condition of the coated driver can be determined from the condition of the interference fit, or loss thereof, without having to measure clearance between the driver and the socket coupling surface, as was previously required with a noncoated metal driver, to determine whether the level of wear or clearance had reached a threshold where replacement was required.

Additionally, the coupling joint formed by the coated driver installed with an interference fit in the socket does not require any lubrication, e.g., the coupling joint is a non-lubricated coupling. Advantageously, this reduces system downtime by eliminating periodic lubrication of the coupling, as would be required for an uncoated metal driver. Further, the absence of lubrication in the coupling eliminates the potential for the lubricant to function as a carrier for collection of dust, debris or other contamination, etc. As further described herein, the coated driver is recyclable, such that the metal core of the coated driver can be reclaimed by removal of the polymeric casing, and the reclaimed metal core recoated with a new casing thus forming a recycled coated driver including the reclaimed core. As such, the coated driver including the reusable metal core provides advantages with respect to sustainable manufacturing and lower lifetime cost, as compared with single use noncoated metal drivers which must be scrapped when worn beyond useful life.

In an illustrative example, a coated driver is provided, the driver configured for engaging a socket including a cavity defined by a coupling surface, the driver including a core made of a metal-based material and including a plurality of exterior surfaces, and a casing made of a polymer material, the casing encasing the plurality of exterior surfaces of the core. The casing is shaped such that the driver is configured to engage the socket via the casing in contact with the coupling surface. The driver further includes a contoured perimeter drive surface defined by the casing, wherein the driver is configured to engage the socket via the contoured perimeter drive surface in contact with the coupling surface. In one example, the coated driver is characterized by a first driver width when the driver is not engaged with the socket, and a second driver width when the driver is engaged with the socket, where the second driver width is less than the first driver width and the second driver width is defined by compression of the casing in contact with the coupling surface. The core can be made of a stainless steel material, and the casing can be made of a polymer material which is a urethane-based material. In an illustrative example, the urethane-based material is a thermoset urethane of about 65 durometer Shore A hardness to about 65 durometer Shore D hardness. By way of example, the urethane-based material can have a DIN resilience in a range of about 40% to 45% and a cured specific gravity in a range of about 1.1 to 1.2 (g/cm$^3$).

In an illustrative example, the plurality of exterior surfaces defined by the core includes a plurality of corner chamfers, where each of the corner chamfers has an octagonal shape. In an illustrative example, the plurality of exterior surfaces defined by the core includes a plurality of corner chamfers, and the casing includes a plurality of corner portions configured such that each corner portion encases a respective corner chamfer, and where each corner portion of the casing is characterized by a rounded contour in a first plane normal to the corner chamfer and a convex contour in a second plane normal to the corner chamfer, where the second plane is normal to the first plane. In another example, the plurality of exterior surfaces includes a plurality of faces and a plurality of corner chamfers, where each corner chamfer is intermediate one of the faces and another of the faces, and the casing is adhered to the plurality of faces and the plurality of corner chamfers and is defined by a convex contoured surface relative to the plurality of faces. The driver can include a bore extending through the core and defined by a bore surface, where the casing is configured such that the bore surface is not encased by the casing. The driver can include a bore extending through a face of the core and through the casing, where the casing adjacent the bore is characterized by a concave contour relative to the face of the core.

A method for engaging a driver to socket is described herein. In an illustrative example, the socket includes a cavity defined by a coupling surface, the method including providing a coated driver as described herein, and inserting the driver into the cavity such that the casing is in contact with the coupling surface, which can include engaging the socket via the contoured perimeter drive surface in contact with the coupling surface. In this example, the casing in contact with the coupling surface defines a contact interface, such that the contact interface is characterized by zero clearance between the casing and the coupling surface. The method can further include applying a rotational force input to the driver and transmitting the rotation force to the socket via the casing, where transmitting the rotation force is characterized by zero backlash. The coated driver engaged to the socket with zero backlash, in the example, is characterized by no running noise generated at the contact interface during transmission of the rotation force, providing a silent or substantially silent operation of the coupling system 100.

A method for forming a coated driver is described herein, the method including inserting a core configured as described herein, into a mold defining a casing including a contoured perimeter drive surface, the method further including flowing a polymer-based material into the mold such that the polymer-based material is in contact with the exterior surfaces of the core, curing the polymer-based material, where curing includes forming the casing, the casing encases the plurality of exterior surfaces, and the coated driver includes the core encased by the casing. The method can further include reclaiming a core from a coated driver, and recoating the core with a new casing, such that, as described further herein, the core can be recycled. In this example, the driver is a first driver including a first core encased by a first casing, and the method includes recycling the first core by removing the first casing from the first core, and forming a second driver including the first core and a second casing.

The above noted and other features and advantages of the present disclosure are readily apparent from the following detailed description when taken in connection with the accompanying drawings.

DETAILED DESCRIPTION

Figure 1:
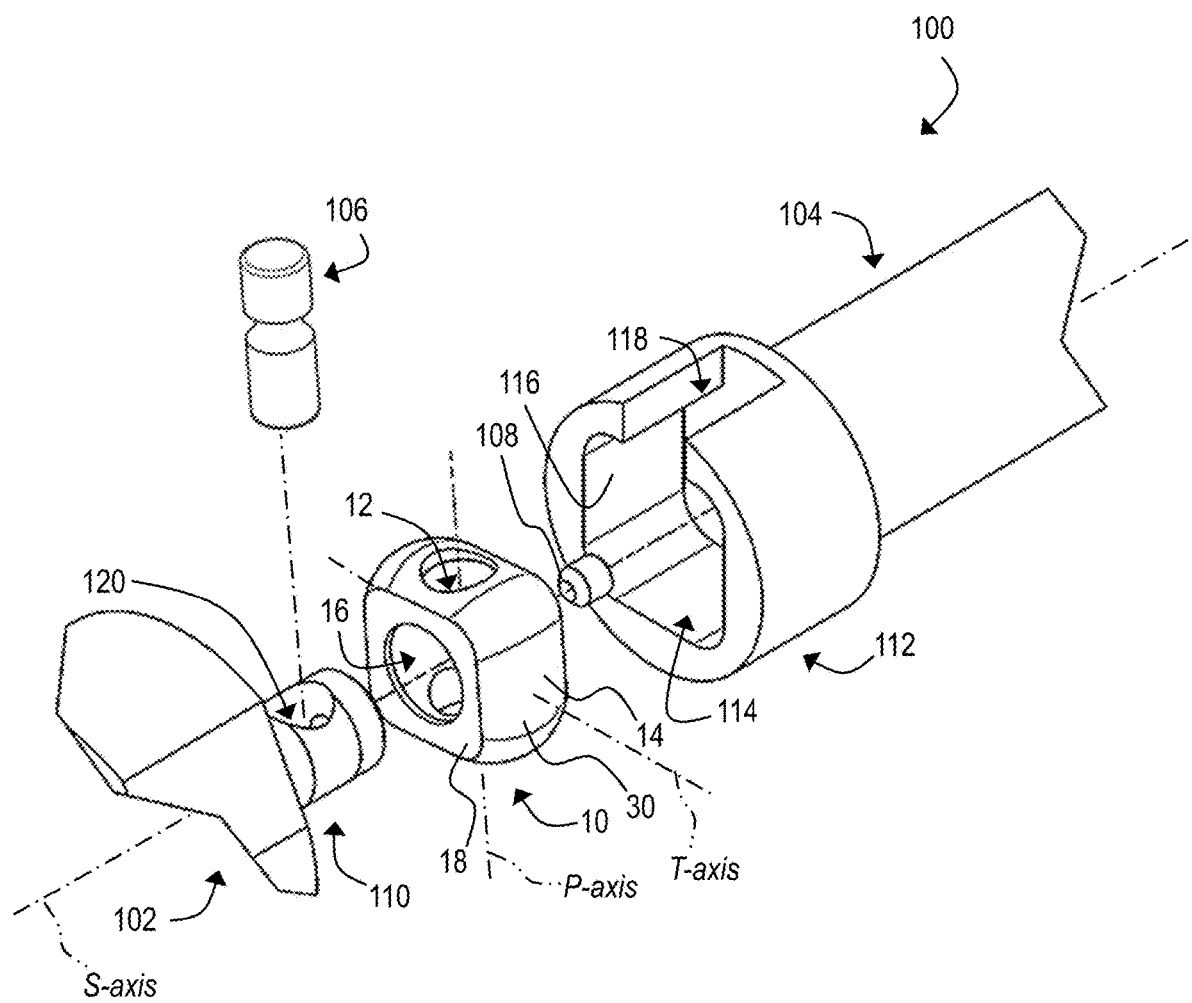
FIG. 1 shows a schematic perspective view of a drive system including an exemplary coated driver for coupling a driving device to a driven device.
Figure 2:
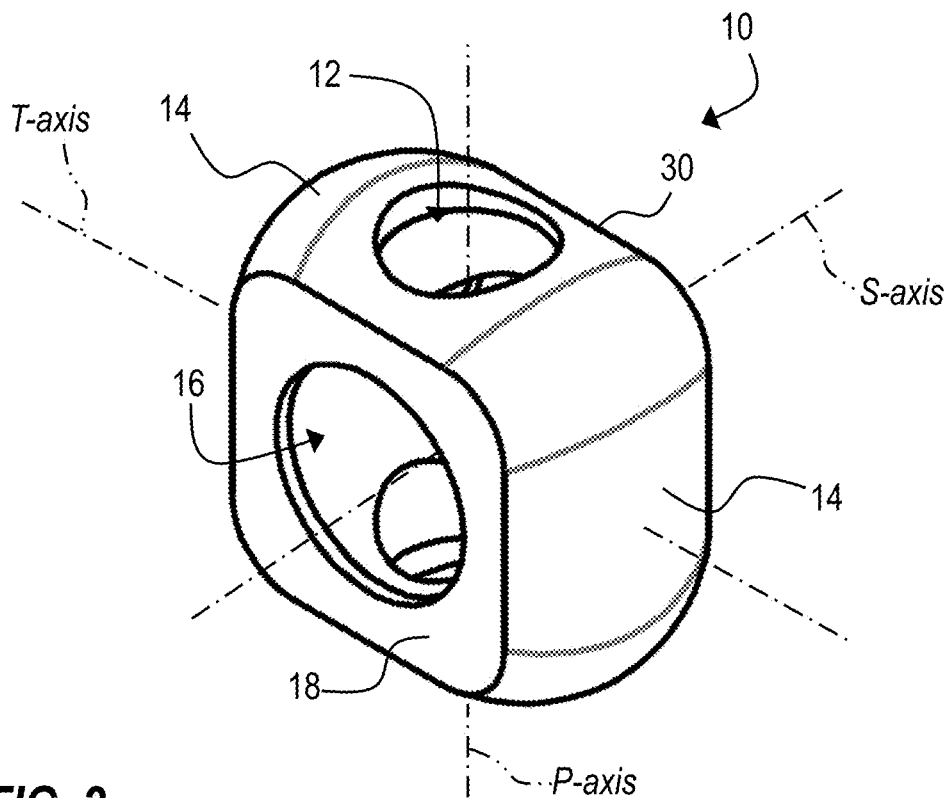
FIG. 2 shows a schematic perspective view of the coated driver of FIG. 1.
Figure 3:
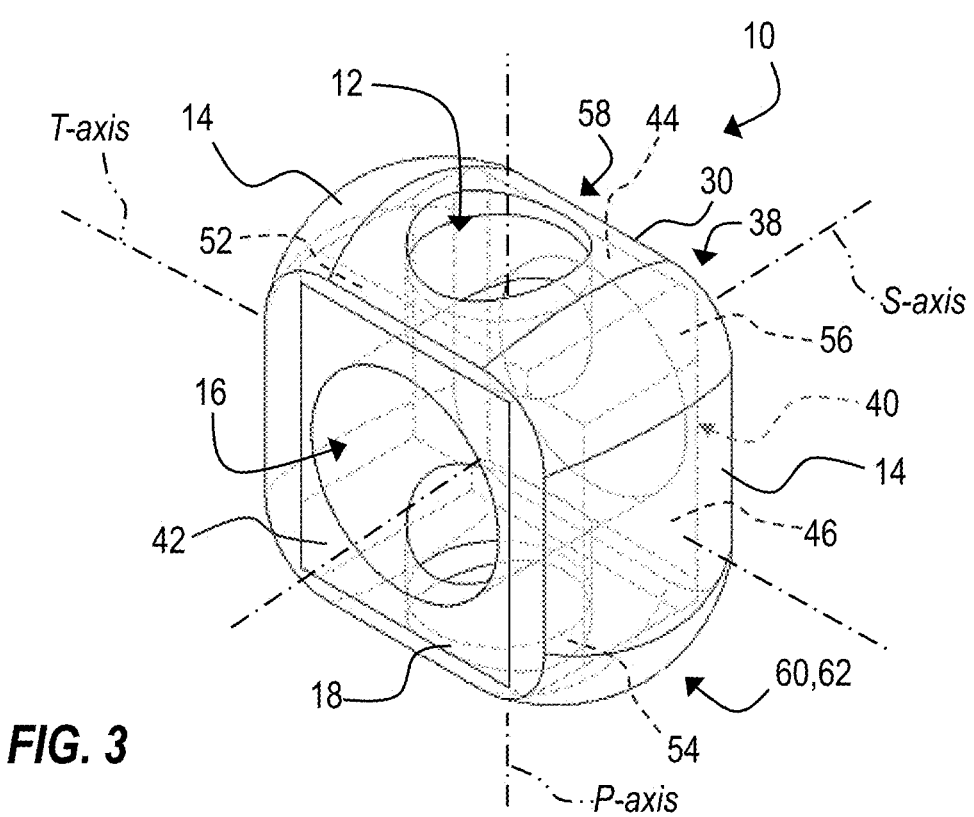
FIG. 3 shows a schematic perspective view of the coated driver of FIG. 2, including a core and casing, further showing the core member in phantom.

The present disclosure provides a drive coupling system which includes a coated driver for coupling a driving device such as a motor, to a driven device such as a timing screw, gear box, etc., where in an illustrative example the coated driver transmits a rotational force from the driving device through a socket coupling connected to the driven device. The coated driver includes a core member, referred to herein as a core, and a casing which is formed on and attached to the core member. The casing is made of a polymeric material and is formed as a single integral casing which defines a continuous perimeter drive surface of the core member. The perimeter drive surface is contoured such that the casing has a variable thickness, as further described herein. The core, which in an illustrative example is made of a metal-based material, includes a shaft bore to receive an input shaft of the driving device, and pin bore to receive a coupling pin. In a non-limiting example, the casing of the coated driver has a rounded square perimeter surface including rounded square and convex corner portions, for coupling with a metal socket cavity having a square or rounded square coupling surface. The uninstalled width of the coated driver is slightly larger than the width of the socket cavity, such that, when installed to the coupling socket, the casing is compressed to provide an interference fit between the coated driver and the coupling surface of the socket cavity, the interference fit defining a contact interface between the casing and the socket. The compression of the casing and the resulting interference fit advantageously results in a zero clearance connection between the coated driver and the socket, such that when a rotational force is applied to the coated driver, the coated driver transfers a corner force component of the rotational force to the coupling socket via the casing corner portions, and transfers an interface force component FI of the rotational force to the coupling socket across the contact interface, with zero backlash. Further, because the casing is maintained in contact with the coupling surface of the socket at all times, due to the interference fit, there is no clearance to take-up during starting and stopping of rotation of the driver, such that the coupling does not generate any running noise, providing for quiet or near silent operation during indexing, stop-start cycling and/or other intermittent operation of the driven device, which may be, for example, a timing screw. By distributing transmission of the rotational force between a corner force component FC of the rotational force transmitted through the casing corner portion and an interface force component FI transmitted through the side and pin portions of the casing, point loading of the corner portions is decreased relative to the corner loading imposed on the metal corners of an uncoated metal driver, thus substantially reducing wear at the contact interface between the coated driver and the coupling surface, and extending the useful life of the coated driver.

The coated driver described herein is advantaged by a relatively longer life as compared with an uncoated metal driver, due to the differences in rotational force transfer between the coated driver and the coupling socket. Because the casing of the coated driver is maintained in contact with the coupling surface over a contact interface of substantially larger area than the corner contact of the uncoated metal driver, the rotational force is distributed across the contoured perimeter surface of the casing, decreasing wear. Further, as detailed herein, the corner portions of the casing are compressed during the start of rotation, damping the contact force such that the contact force is not directly applied to the metal core member. In the examples described herein, the corners of the metal core are chamfered such that corner contact force transmitted through the corner portion of the casing is distributed across the corner chamfer of the metal core to increase the durability of the coated driver, as compared with the durability of an uncoated metal driver. Over time, wear may occur at the casing corners and in the contact interface extending along the side portions of the casing, such that over time, a slight clearance can develop between the driver casing and the socket coupling surface, such that the coated driver can be slipped from the socket cavity, providing a visual indication that replacement of the coated driver should be considered, without having to measure clearance between the driver and the socket coupling surface, as was previously required with a noncoated metal driver, to determine if replacement was required.

As further described herein, the coated driver is recyclable, such that the metal core of the coated driver can be reclaimed and recoated, by removing the current casing, and recoating the reclaimed metal core with a new casing thus form a recycled coated driver. As such, the coated driver including the reusable metal core provides an advantage with respect to sustainable manufacturing, as compared with a single use noncoated metal driver which must be scrapped when worn beyond its useful life.

Referring to the drawings wherein like reference numbers represent like components throughout the several figures, the elements shown in FIGS. 1-25 are not necessarily to scale or proportion. Accordingly, the particular dimensions and applications provided in the drawings presented herein are not to be considered limiting. Referring to FIG. 1, a drive system 100 is shown. The drive system 100 can also be referred to herein as a drive assembly or coupling system. In the illustrative example shown, the drive system 100 includes a driving device 102 and a driven device 104 which are coupled via a coated driver 10. The coated driver 10 can also be referred to herein as the driver 10. The driving device 102 includes an output shaft 110 and is actuable to output a rotation force 22 via the output shaft 110, by rotating the output shaft 110. In a non-limiting example, the driving device 102 includes a motor. The drive system 100 includes a driven device 104 including a coupling 112. In a non-limiting example, the driven device 104 includes a timing screw which is rotated by the rotation force 22 output from the driving device 102 and transferred to the coupling 112 via a coated driver 10 connecting the output shaft 110 to the coupling 112. In a further example, the timing screw and/or the drive system 100 can be configured for use in container handling applications, including food and drug container processing, where the components of the drive system 100 are configured for compliance with food-grade and/or pharmaceutical processing requirements, including forming the coated driver 10 from materials meeting these requirements.

In an illustrative example, the coated driver 10 can include a core 40 made of stainless steel encased in a casing 30 made of a food-grade urethane coating material, such that the coated driver 10 is suitable for use in timing screw and container handling applications requiring compliance with food and drug material handling requirements. In another example, the driven device 104 can be any device actuable by a rotation force 22, such as a gearbox, etc.

In the illustrative example shown in FIG. 1, the coupling 112 is configured as a socket coupling, including a socket 114 defined by an interior surface 116 of the coupling 112. The interior surface 116 can also be referred to herein as the socket surface or coupling surface 116. In use, the coupling surface 116 is in contact with a contoured perimeter drive surface 14 (see FIGS. 13 and 21) of the coated driver 10 via an interference fit of the coated driver 10 to the socket cavity 114, such that a rotation force 22 transmitted from the output shaft 110 is transmitted through the driver 10 and the socket coupling 112 to the driven device 104. In the example, the coupling system 100 further includes a coupling pin 106, also referred to herein as a cross-pin 106, and a locking pin 108. In the example shown, the output shaft 110 includes a coupling bore 120 for receiving the cross-pin 106, and the socket coupling 112 includes a coupling slot 118 for receiving the cross-pin 106. The coated driver 10 includes a casing 30 and a core 40 (shown in phantom in FIG. 3). The coated driver 10 further includes a shaft bore 16 defined by a shaft bore surface 48 and configured for receiving the output shaft 110 via a driver face 18, and a pin bore 12 defined by a pin bore surface 50 and configured for receiving the cross-pin 106. The casing 30 is made of a polymer-based material and is formed onto the core 40 such that the casing 30 substantially encases the exterior (non-bore) surfaces 42, 44, 46, 52, 54, 56 of the core 40. The casing 30 defines the contoured perimeter drive surface 14 (see FIGS. 13 and 21) which is at least partially compressed during installation of the driver 10 to the socket cavity 114, to provide an interference fit between the driver 10 and the coupling surface 116 of the socket coupling 112. In the example shown, the cross-pin 106 is inserted through the coupling slot 118, pin bore 12 and coupling bore 120 to operatively connect and couple the driving device 102 to the driven device 104. The locking pin is configured to engage an annular groove in the cross-pin 106 to lock the cross-pin 106 in position.

Throughout the description and figures and for illustrative purposes, a coordinate system comprising a P-axis, S-axis and T-axis is used. As shown in FIG. 1, the P-axis, which can also be referred to herein as the pin axis, is defined as the axis of the pin bore 12 which is coincident with the longitudinal axis of the cross-pin 106 when the cross-pin 106 is installed to the coated driver 10. The S-axis, which can also be referred to herein as the shaft axis, is defined as the axis of the shaft bore 16, and is coincident with the longitudinal axis of the output shaft 110 when the output shaft 110 is positioned in the shaft bore 16. The T-axis, which can also be referred to herein as the transverse axis, is orthogonal to the P-axis and the S-axis, and intersects the intersection of the P-axis and the S-axis. Throughout the description and figures and for illustrative purposes, the coated driver 10 is configured, in a non-limiting example, as a rounded square driver 10 having a width and height which are substantially equal and indicated in the figures as a driver width DW, and further defining a driver length DL, a driver diagonal dimension DD, and a driver face width DF, as shown in the figures. The driver width DW, as that term is used herein, is the width and height of the casing 30 and the coated driver 10 in the uninstalled condition, e.g., without compression of the casing 30. The driver length DL, as that term is used herein, is the length of the casing 30 and the coated driver 10, measured across opposing driver faces 18 (front and rear faces including the shaft bore 16, as viewed along the S-axis in FIG. 1). The core 40 is configured, as shown in FIGS. 4 and 14-19, as a rectangular cuboid including chamfered edges, the core 40 having a width and height which are substantially equal and indicated in the figures as a core width CW, and further defining a core length CL, a core diagonal dimension CD, a core face width CF and chamfer dimensions CC, SS, PS as shown in the figures. The casing 30 encapsulates the exterior (non-bore) surfaces 42, 44, 46, 52, 54, 56 of the core 40 such that DW>CW, DL>CL, DD>CD and DF>CF. The casing 30 is contoured such that a thickness 20 of the casing 30 is variable. As used herein, the thickness 20 of the casing 30 is measured along a line projected normal to the surface of the core 40 at the point where the casing thickness 20, from the surface of the core 40 to which the casing 30 is adhered to the exterior surface of the casing 30.

Figure 7:
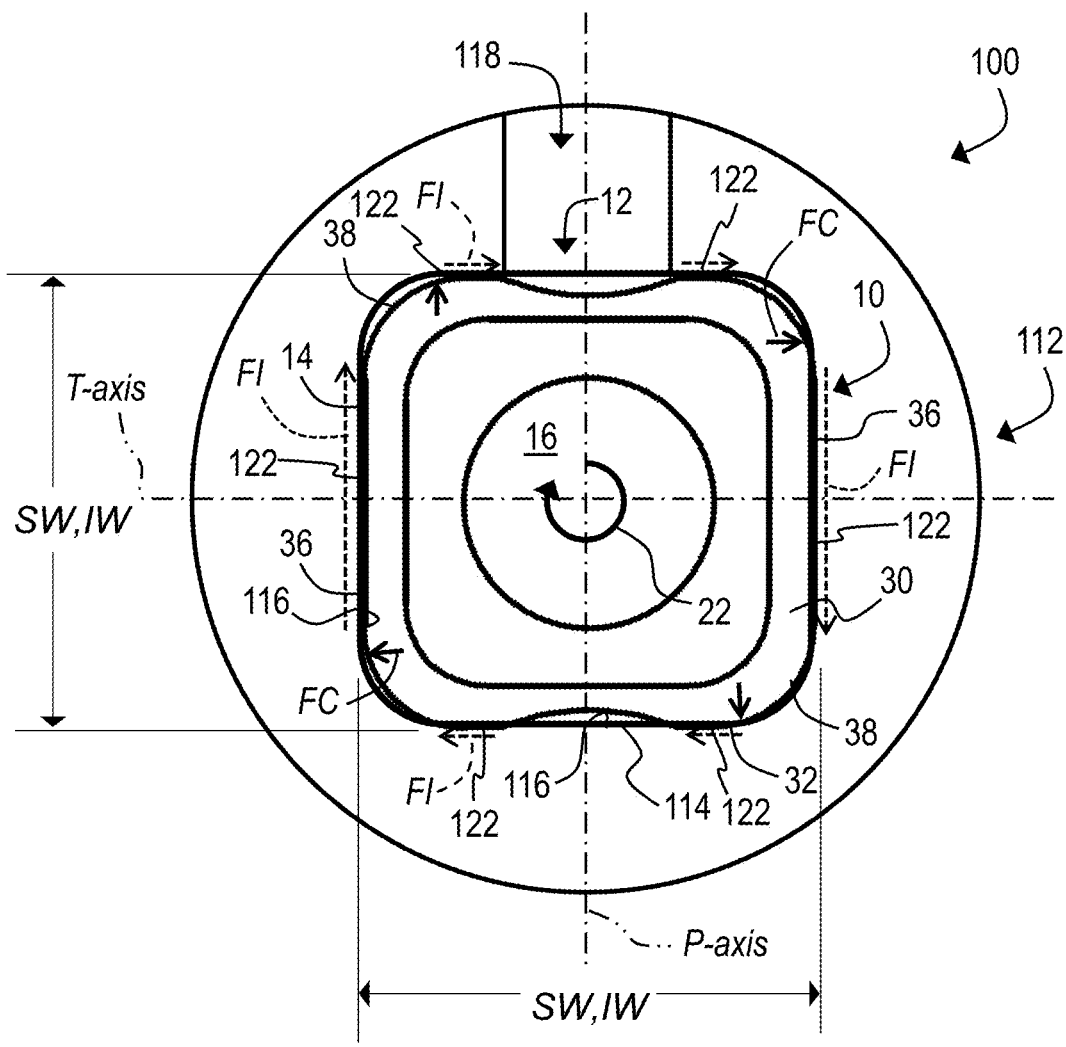
FIG. 7 shows a schematic front elevational view showing the coated driver inserted in an installed position to a coupling of the drive system of FIG. 1.
Figure 8:
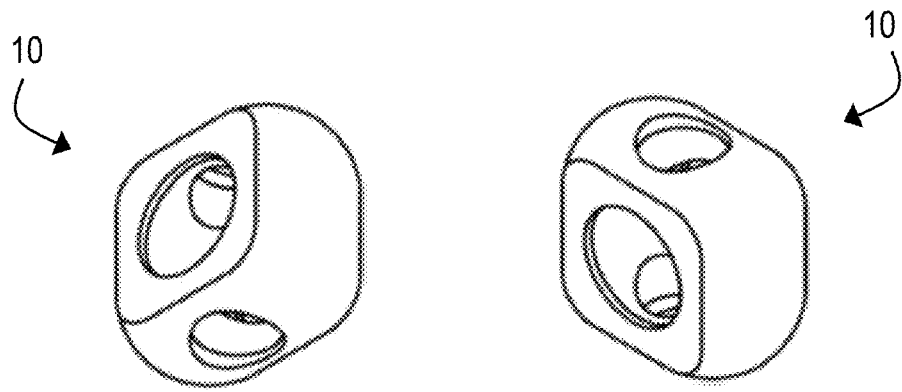
FIG. 8 shows a schematic perspective view of exemplary coated drivers.

The coupling socket 112 includes a socket cavity 114 having a rounded square shape, as shown in FIGS. 1 and 7, the cavity 114 having a width and height which are substantially equal and indicated in the figures as a socket width SW. Referring to FIG. 7, shown is a coated driver 10 installed in the socket cavity 114, where, as described previously, the casing 30 is compressed during installation of the driver 10 to the socket cavity 114 to provide an interference fit between the driver 10 and the coupling surface 116 of the socket coupling 112, such that, in the installed condition, the perimeter drive surface 14 of the driver 10 in contact with the coupling surface 116 of the socket cavity 114 to define one or more areas of contact interface 122 therebetween. The width of the coated driver 10 is compressed in the areas of the contact interface 122 from the uninstalled driver width DW to an installed driver width IW, which is defined by and substantially equal to the socket width SW, such that in the areas of the contact interface 122 there is zero clearance between the coupling surface 116 and compressed perimeter drive surface 14.

Referring to FIGS. 2-6, a non-limiting example of a coated driver 10 is shown. The coated driver 10 includes a core 40 which is coated with a polymeric material forming a casing 30 encapsulating the outer surfaces of the core 40. The casing 30 can be formed from any polymeric material which can be fabricated (molded, cast, potted, etc.) to form a casing 30 including the shape and surface finish characteristics, adhesion properties (for adhesion of the casing 30 to the core 40), abrasion resistance, wear resistance, hardness, resilience and load bearing properties required by the coated driver 10 in use, as described in further detail herein. In an illustrative example, the casing 30 is formed of a thermoset urethane material configured to provide the adhesion properties, abrasion resistance, wear resistance, resilience and load bearing properties required by the coated driver 10 in use, as described in further detail herein. The thermoset urethane material can be a food-grade urethane. In a non-limiting first example, a casing 30 is formed from a thermoset urethane material including a cross-linker and having a tensile strength of greater than 5000 pounds per square inch (psi), a 100% modulus of greater than 1800 psi, a 300% modulus of greater than 2900 psi, and an elongation of 490%. In one example, the urethane material is characterized by one or more of a DIN resilience in the range of about 40% to 45%, and is a urethane of about 65 durometer Shore A hardness to about 65 durometer Shore D hardness. The hardness and resilience of the casing material can be varied, for example, to obtain certain operating characteristics of the coupling system 100, and/or based on the configuration of the components of the coupling system 100. For example, a coated driver 10 can be configured with a casing 30 having relatively higher resilience and/or a relatively lower hardness of in a range of about 65 durometer Shore A to about 90 durometer Shore A to provide a coated driver 10 which exhibits a relatively higher compressibility during installation to the socket 114, and/or when a relatively more elastic response to rotational loading is desirable. For example, a coated driver 10 can be configured with a casing 30 having relatively lower resilience and/or a relatively higher hardness of in a range of about 85 durometer Shore A to about 65 durometer Shore D to provide a coated driver 10 which exhibits a relatively lower compressibility during installation to the socket 114, and/or when a relatively less elastic response to rotational loading is desirable. For example, a coated driver 10 can be configured with a casing 30 having a mid-range hardness in a range of about 85 durometer Shore A to about 95 durometer Shore A. In another example, the coated driver 10 has a casing 30 which a hardness of at least 90 durometer Shore A. In one example, the casing 30 has a cured specific gravity in the range of about 1.1 to 1.2 (g/cm$^3$).

As an illustrative example, sample coated drivers 10 including a casing 30 made of a thermoplastic ultra-high-molecular-weight polyethylene (UHMWPE, UHMW) and subject to durability testing produced unsatisfactory results, including loss of adhesion at the casing-core interface. Natural polymers, such as natural rubbers, may not have sufficient strength and/or abrasion resistance for use in the casing 30 described herein.

The core 40 is made of a material which has sufficient strength, rigidity and wear resistance to transfer the rotation force 22 from the output shaft 110 to the socket coupling 112 via the bore surfaces 48, 50 through the coated driver 10 as described in further detail herein. In an illustrative example, the core 40 is formed of a metal-based material such as a steel, aluminum or other metal material. In one example, the core 40 is formed of a stainless steel material, for strength, wear resistance, corrosion resistance and/or for compliance with food and drug industry material handling equipment requirements. In the example shown, the surfaces of the pin bore 12 and the shaft bore 16 are uncoated, such that the metal bore surfaces 48, 50 are respectively in contact with the metal output shaft 110 and the metal cross-pin 106 as bearing surfaces. The example of a metal based core is non-limiting, and other materials and/or combinations of materials to which the casing 30 can be adhered and which can provide the functional properties of the core 40 are anticipated within the scope of this disclosure, including, for example, a core 40 formed of a high strength wear resistant polymer such as a filled polymer, or a core 40 formed of a combination of materials, for example, a polymer core 40 including metal bearing sleeve(s) forming one or both of the shaft and pin bores 16, 12.

Figure 4:
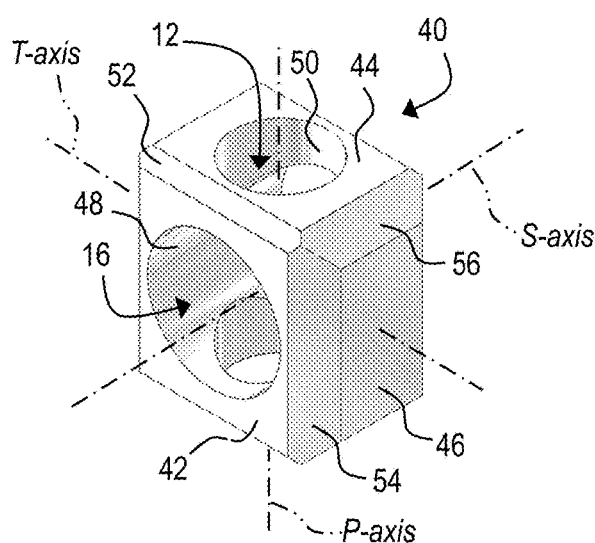
FIG. 4 shows a schematic perspective view of the core of the coated driver of FIG. 3.
Figure 14:
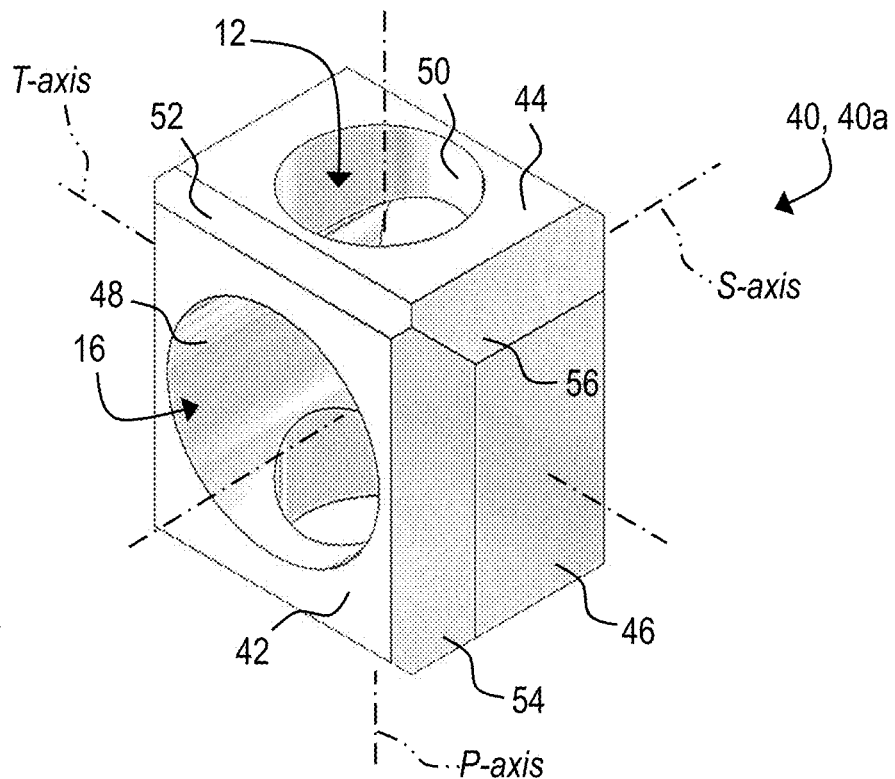
FIG. 14 shows a schematic perspective view of an exemplary core of the coated driver of FIG. 3, the core including a plurality of chamfers.
Figure 15:
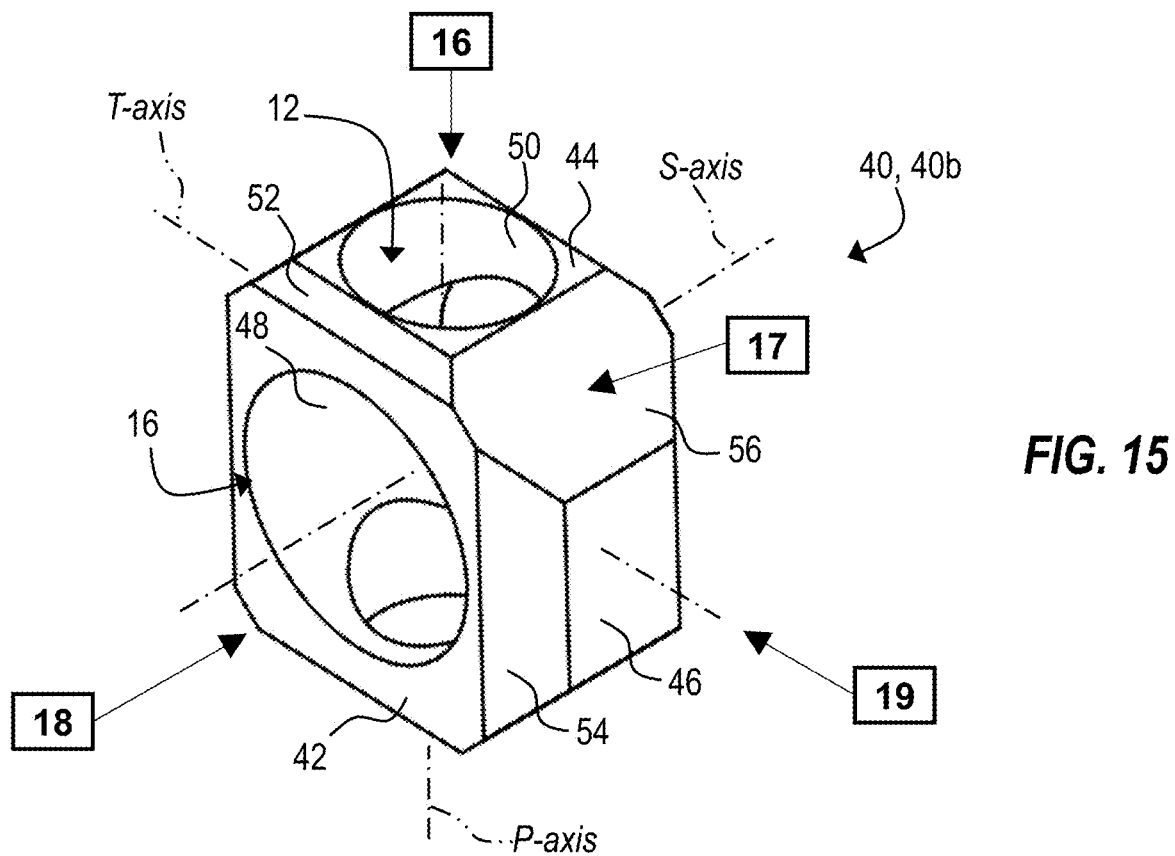
FIG. 15 shows a schematic perspective view of another exemplary core of the coated driver of FIG. 3, the core including a plurality of chamfers.
Figure 16:
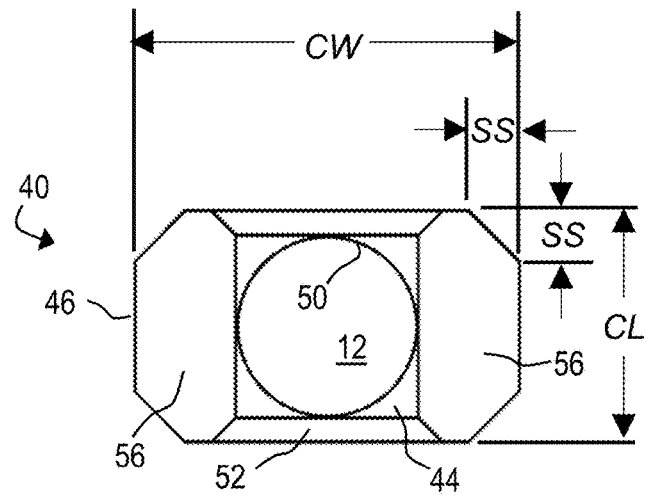
FIG. 16 shows a schematic top end view of the core of FIG. 15.
Figure 17:
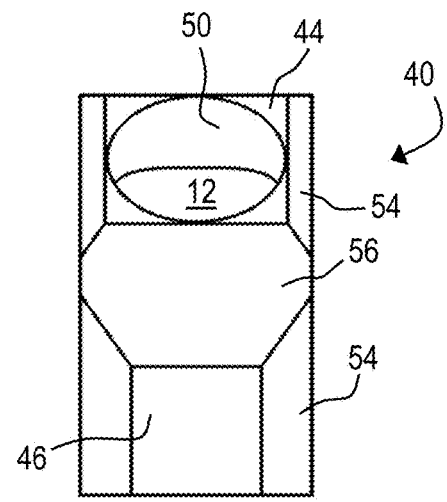
FIG. 17 shows a schematic corner view of the core of FIG. 15.
Figure 18:
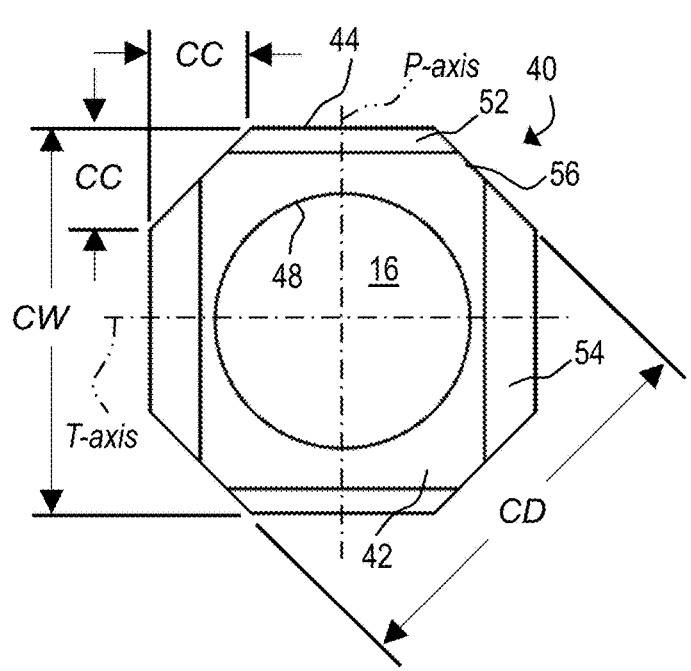
FIG. 18 shows a schematic front elevational view of the core of FIG. 15.

Referring to FIGS. 4 and 14-19, shown are illustrative examples of an uncoated core 40, indicated as core 40a in FIGS. 4 and 14 and as core 40b in FIGS. 15-19 and referred to collectively herein as a core 40. The examples shown in the figures are illustrative and non-limiting, and other configurations of the core 40, for example, including chamfers 52, 54, 56 having shapes and/or relative dimensions other than those shown, are anticipated within the scope of this disclosure. Referring to FIGS. 15 and 15, the core 40 includes a shaft bore 16 defined by a shaft bore surface 48 and configured for receiving the output shaft 110 via a driver face 18, and a pin bore 12 defined by a pin bore surface 50 and configured for receiving the cross-pin 106. The shaft bore surface 48 and the pin bore surface 50 can be referred to collectively herein as the bore surfaces 48, 50 and/or as the interior surfaces 48, 50 of the core 40 and/or the coated driver 10. In a non-limiting example, the casing 30 does not extend into the bores 16, 12, such that the bore surfaces 48, 50 are not encased by the polymer casing 30, and such that, in use, the metal bore surfaces 48, 50 are in respective contact with the wear resistant metal surfaces of the output shaft 110 and the cross-pin 106, to function as bearing surfaces 48, 50.

Still referring to FIGS. 14 and 15, the core 40 includes a plurality of faces 42, 44, 46, 52, 54, 56 collectively referred to herein as the exterior surfaces or non-bore surfaces of the core 40. The core 40 includes opposing (front and rear, as viewed in FIGS. 14 and 15) shaft faces 42 having a core face width CF (see FIGS. 19, 22, 23). The core 40 includes opposing pin faces 44 (top and bottom, as viewed in FIGS. 15 and 15), and opposing first and second side faces (left and right, as viewed in FIGS. 15 and 15). The core 40 further includes a plurality of chamfer faces, which are also referred to as chamfers, including pin-shaft (PS) chamfers 52, side-shaft (SS) chamfers 54, and corner (CC) chamfers 56. The plurality of chamfers 52, 54, 56 truncate the edges of the rectangular cuboid shape of the core 40. Notably, the thickness 20 of the casing 30 in these chamfered areas is relatively thicker as compared to a non-chamfered core having sharp edges adjoining the faces 42, 44, 46, and such that the relatively thicker areas of the casing 30 can function to absorb, dampen and/or distribute the rotational forces 22 imposed on the coated driver 10 during use, to lessen the rotation force 22 transferred via the casing 30 to the core 40, including the corner forces FC (see FIG. 7) imposed on the coated driver 10 during start/stop, indexing and intermittent operation of the drive system 100. The chamfers 52, 54, 56 also promote the flow of the coating material across and over the exterior surfaces 42, 44, 46, 52, 54, 56 of the core 40 during the coating process forming the casing 30, for example, in a mold cavity and/or potting device for molding the casing 30 onto the core 40, in contrast to a core member formed without chamfers 52, 54, 56 having sharp (perpendicular or near perpendicular) edges and corners intermediate faces 42, 44, 46, and reduce the potential for loss of adhesion of the casing 30 to the core 40 at the transition between the faces 42, 44, 46, 52, 54, 56, as compare with the potential for loss of adhesion of the casing 30 at a sharp edge or corner under repetitive rotational loading and over time.

Figure 19:
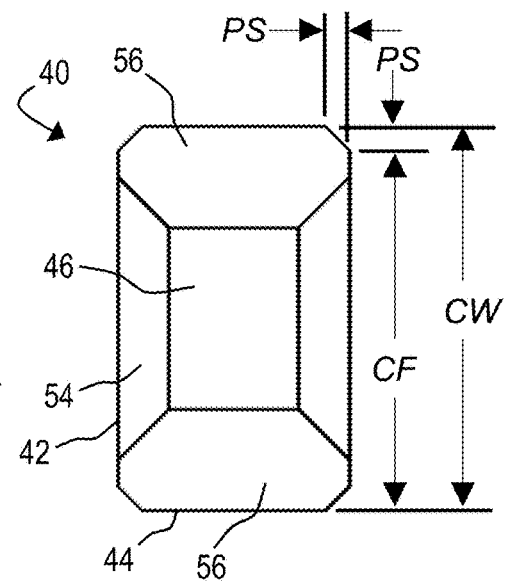
FIG. 19 shows a schematic side elevational view of the core of FIG. 15.
Figure 20:
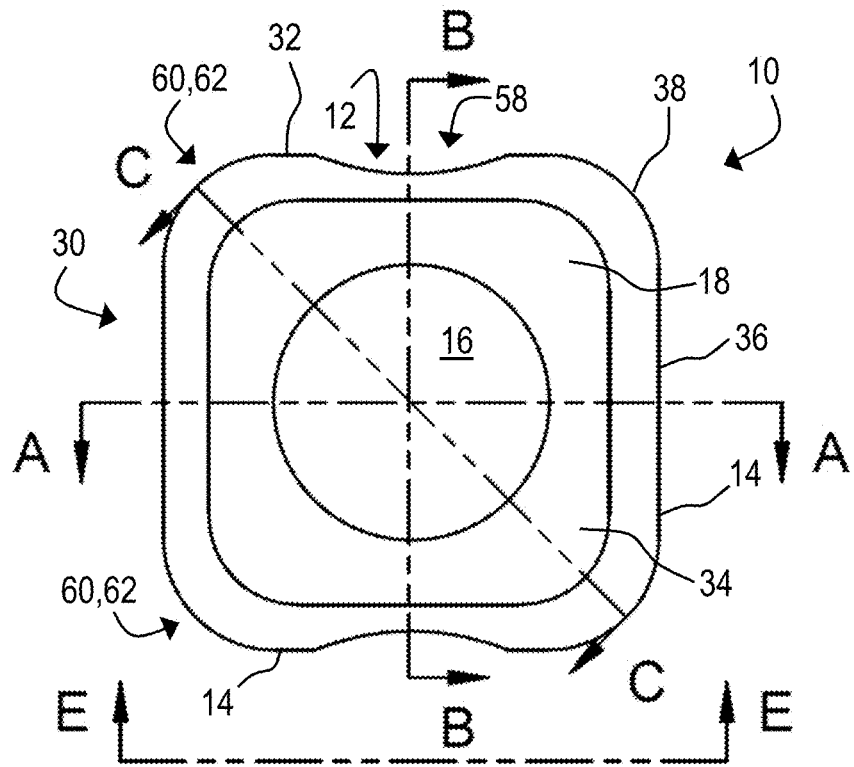
FIG. 20 shows a schematic front elevational view of the coated driver of FIG. 2.

As shown in the figures, each of the pin-shaft (PS) chamfers 52 is intermediate a pin face 44 and a shaft face 42 of the core 42 and is characterized by a chamfer dimension PS (see FIG. 19). Each of the side-shaft (SS) chamfers 54, is intermediate a side face 46 and a shaft face 42 of the core 42 and is characterized by a chamfer dimension SS (see FIG. 16). Each of the corner (CC) chamfers 56 is intermediate a pin face 44 and a side face 46 of the core 42 and is characterized by a corner chamfer dimension CC (see FIG. 18). In the example shown in FIG. 14, each of the chamfers 52, 54, 56 has a hexagonal shape, sharing common edges with two adjacent faces and four adjacent chamfers. For example, the corner chamfer 56 has a hexagonal shape and has a common edge with each of a pin face 44, opposing PS chamfers 52, opposing SS chamfers 54 and a side face 46. In the example shown, at least one of the chamfers 52, 54, 56 has a different chamfer size PS, SS, CC, as compared to the chamfer size PS, SS, CC of at least one other of the chamfers 52, 54, 56. In the example shown in FIG. 15, each of the PS and SS chamfers 52, 54 has a quadrilateral shape, sharing common edges with two adjacent faces and two adjacent corner chamfers 56. For example, the PS chamfer 52 has a quadrilateral shape and has a common edge with each of a pin face 44, opposing corner chamfers 56, and a shaft face 42. In the example shown in FIG. 15, each of the corner chamfers 56 has a octagonal shape and has a common edge with each of a pin face 44, a side face 46, opposing shaft faces 42, opposing PS chamfers 52, and opposing SS chamfers 54. In the example shown, at least one of the chamfers 52, 54, 56 has a different chamfer size PS, SS, CC, as compare with at least one other of the chamfers 52, 54, 56, and in the illustrative example, each of the chamfers 52, 54, 56 has a unique size, e.g, the values of PS, SS, CC are different.

Figure 12:
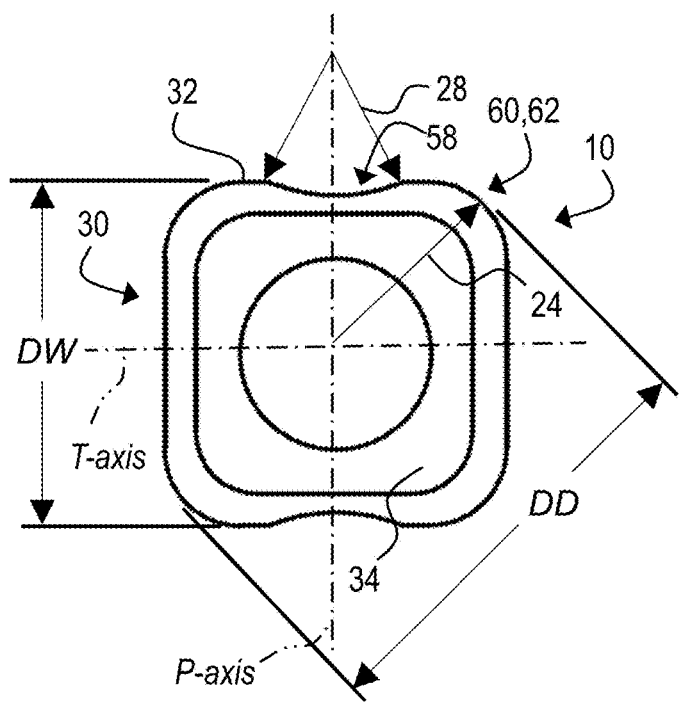
FIG. 12 shows a schematic front elevational view of the coated driver of FIG. 10 showing casing corner portions having a rounded and convex contour.
Figure 13:
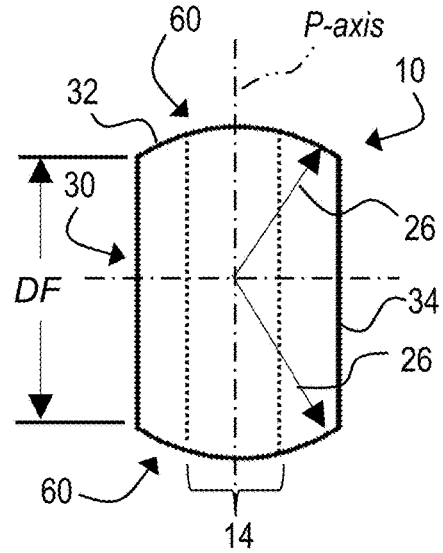
FIG. 13 shows a schematic side elevational view of the coated driver of FIG. 10 showing casing pin portions having a concave contour.
Figure 21:
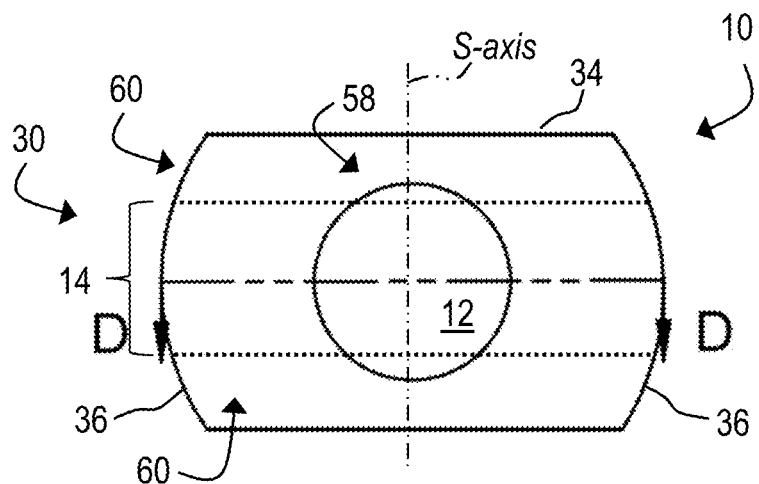
FIG. 21 shows a schematic bottom end view E-E of the coated driver of FIG. 20.
Figure 22:
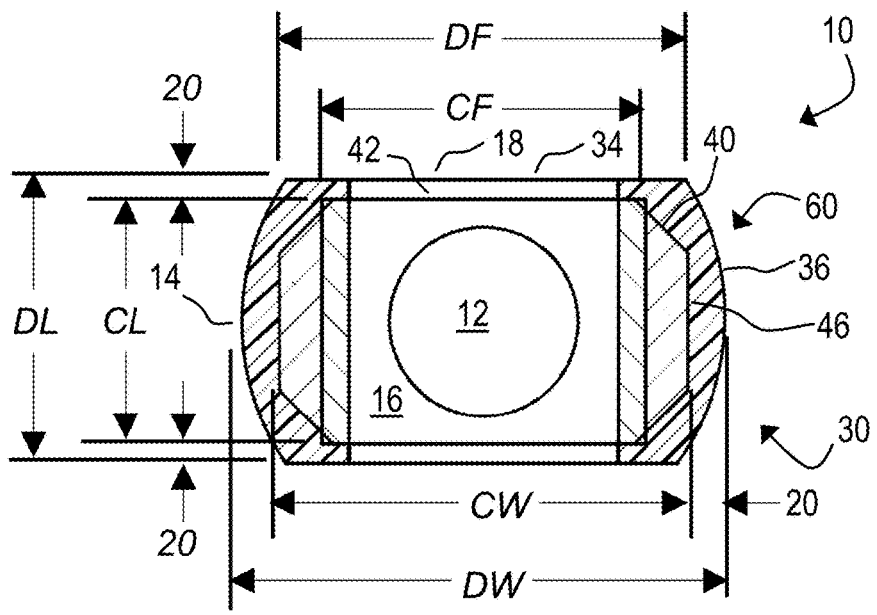
FIG. 22 shows a schematic cross-sectional view of section A-A of FIG. 20.
Figure 23:
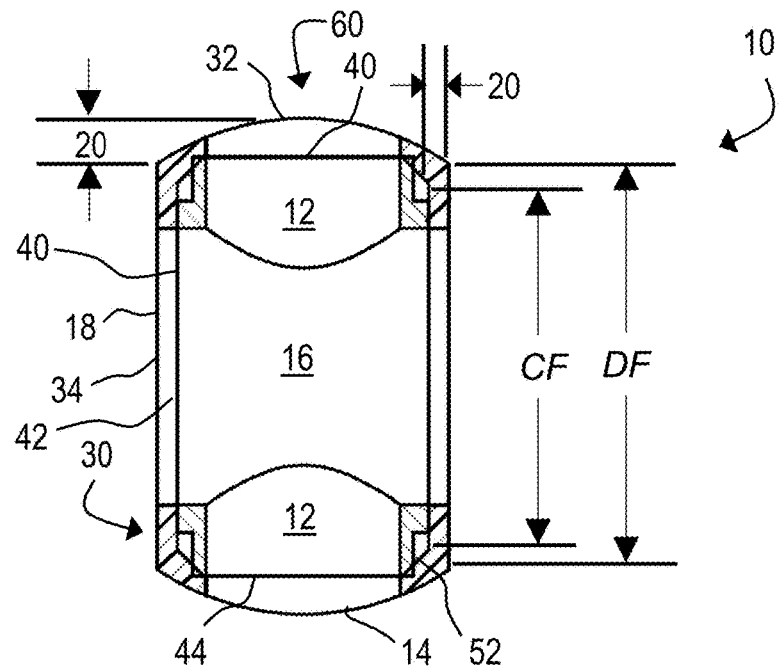
FIG. 23 shows a schematic cross-sectional view of section B-B of FIG. 20.
Figure 24:
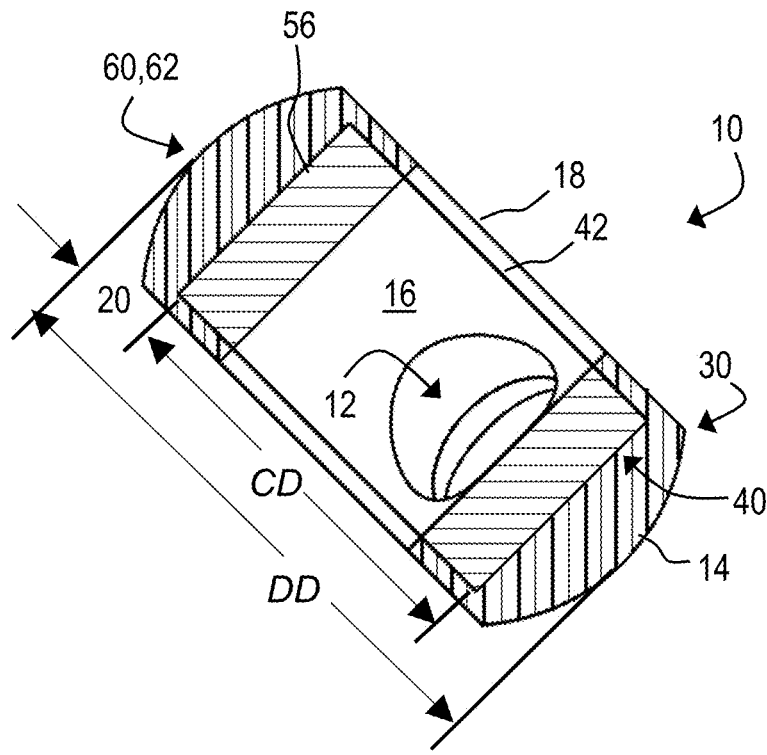
FIG. 24 shows a schematic cross-sectional view of section C-C of FIG. 20.
Figure 25:
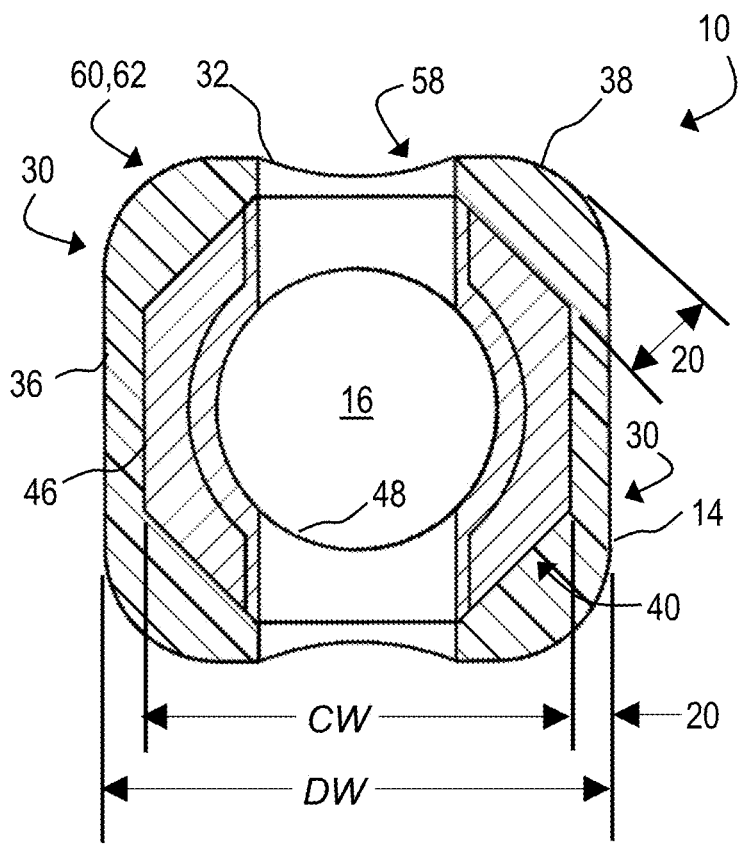
FIG. 25 shows a schematic cross-sectional view of section D-D of FIG. 21.

FIGS. 2, 3, 5, 6, and 10-13 show the casing 30 adhered to and encasing the exterior surfaces the core 40 to form the coated driver 10. The casing 30 is formed as an integral, e.g., unitary and continuous casing which in a non-limiting example is molded onto the core 40. The polymeric material, which can be a urethane-type material, such as a high strength and/or thermoset urethane, is introduced in liquid or semi-liquid form or as a resin into a mold containing the core 40, to encase the exterior surfaces 42, 44, 46, 52, 54, 56, and is cured to form the casing 30 including a contoured perimeter drive surface 14 of the casing 30. As shown in FIGS. 13 and 21, the perimeter drive surface 14 extends from a plane including the P-axis and T-axis, along the perimeter of the coated driver 10, to define area of the casing 30 subject to compression and interference fit during installation of the coated driver 10 into the socket 114. The indication of the perimeter drive surface 14 in FIGS. 13 and 21 is intended to be illustrative, recognizing that the actual contact interface 122 defined by the compressed coated driver 10 in contact with the coupling surface 116 of the socket 114 may vary from the illustrative boundaries of the perimeter drive surface 14 provided for illustration in FIGS. 13 and 21, such that the contact interface 122 may be irregular in shape, vary in width, and have areas of non-contact such as in the area of the concave contour 58 defined by the pin face 32, due to variability in the magnitude of interference fit between the coated driver 10 and the coupling surface 116, hardness and/or resilience of the casing 30, and/or axial alignment of the coated driver 10 relative to the socket cavity 114. In the illustrative example, the casing 30 is molded to finished form, e.g., in use is retained in its as molded condition, and is not reshaped or modified by machining, cutting, or any other secondary operations. As such, the surface finish and/or surface texture of the casing 30 is substantially defined by the surface finish and/or surface texture of the mold in which the coated driver 10 is formed. In a non-limiting example, the surface is molded with a substantially smooth surface finish which is absent any texturing or surface discontinuities, to maximize the contact area of contact interface 122 formed by contact of the casing perimeter surface 14 with the coupling surface 116 of the socket coupling 112 in an installed condition to distribute an interface force component FI of the rotation force transferred via the coated driver 10, (see FIG. 7) and to minimize and/or avoid abrasive wear between the casing perimeter surface 14 and the coupling surface 116, thereby extending the useful life of the coated driver 10, for example, relative to the useful life of an all metal uncoated driver.

Figure 5:
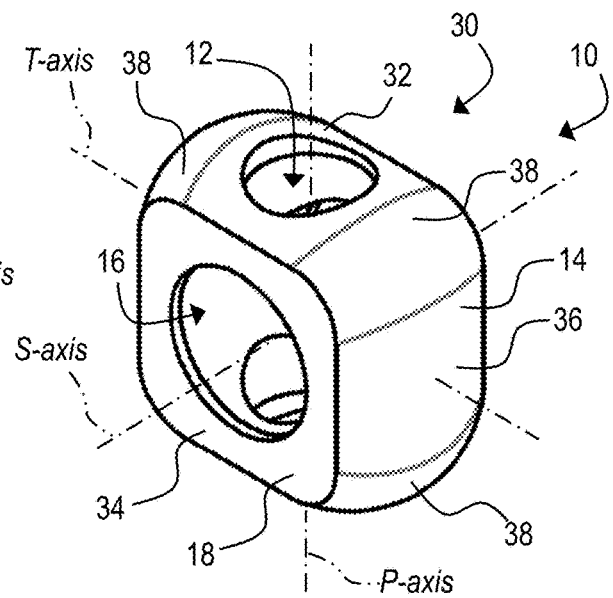
FIG. 5 shows a schematic perspective view of the coated driver of FIG. 2.
Figure 6:
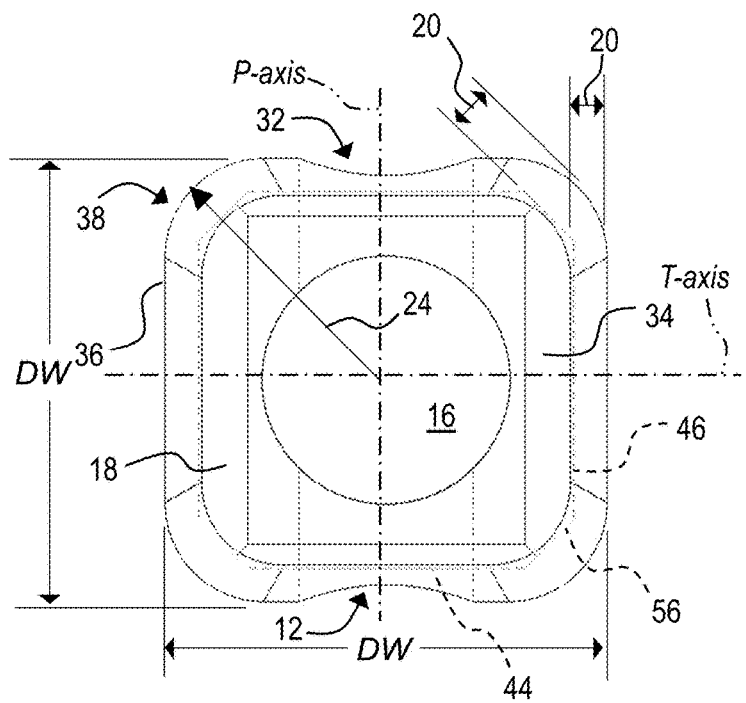
FIG. 6 shows a schematic front elevational view of the coated driver of FIG. 2.

For purposes of describing the structure and function of the casing 30, the casing 30 is described herein as including a plurality of portions 32, 34, 36 and 38, recognizing that the casing 30 is integrally formed such that portions 32, 34, 36 and 38 are continuous and homogeneous portions of the integral casing 30. Referring to FIGS. 5 and 6, the casing 30 includes opposing pin portions 32 each encasing and adhered to a pin face 44 and adjacent PS chamfers 52 of the core 40, opposing shaft portions 34 each encasing and adhered to shaft face 42 of the core 40, opposing side portions 36 each encasing and adhered to a side face 46 and adjacent SS chamfers 54, and four corner portions 38 each adhered to and encasing a corner chamfer 56. As seen in the figures, each portion 32, 34, 36, 38 is continuous with another portion 32, 34, 36, 38 such that the surfaces of the core 40 identified as being encased by a particular portion of the casing 30 can be encased primarily by one of the portions 32, 34, 36, 38 and partially by a combination of other of the casing portions 32, 34, 36, 38, and such that the descriptions of the casing portions 32, 34, 36, 38 are intended for illustrative purposes and are non-limiting.

Referring to FIGS. 5, 10-13 and 20-25, the exterior surface of casing portions 32, 36 and 38 is contoured, having a convex cross-sectional shape 60 defined by a convex radius of curvature 26 (see FIGS. 11, 13) As such, the casing thickness 20 of these portions of the casing 30 is variable, and at a maximum casing thickness 20 within the perimeter drive surface 14, such that, during installation of the coated driver 10 to the socket cavity 114, the casing 30 contacts the coupling surface 116 at its maximum casing thickness 20 and is compressed by the socket surface from an uninstalled driver width DW to an installed driver width IW, where the installed driver width IW is substantially equivalent to the socket width SW. As shown in the figures, the convex contour 60 of the pin portion 32 of the casing 30 is modified by a concave contour 58 adjacent the circumference of the pin bore 12, the concave contour 58 defined by a concave radius of curvature 28 (see FIG. 12) such that the casing thickness 20 is relatively thinner adjacent the pin bore 12. As such, the concave contour 58 aids the insertion of the cross-pin 106 into the pin bore 12 during assembly of the drive system 100, by reducing the casing thickness 20 adjacent the pin bore 12 and thereby reducing resistance to insertion of the cross-pin 106 from contact of the cross-pin surface with the casing 30.

As shown in the figures, the convex contour 60 of the corner portion 38 of the casing 30 is modified by a rounded contour 62 to form rounded corner radius 24 of the coated driver 10, as shown in FIGS. 6 and 12. The rounded corner radius 24, the convex radius 28, the core diagonal dimension DD and the corner chamfer dimension CC define the shape and volume of the corner portion of the casing 30, as illustrated by the diagonal cross-sectional views of the coated driver 10 shown in FIGS. 24 and 25, and such that the casing thickness 20 as at a maximum thickness in the corner portions 38. As described previously, and as illustrated in FIG. 7, a corner force component FC of the rotational force 22 is primarily transmitted via the corner portions 38 of the coated driver and across the corner chamfer 56 to minimize forces imposed on the metal core 40 and/or to avoid abrasive wear between the casing 30 at the contact interface 122 between the corner portion 38 of the casing 30 and the coupling surface 116, thereby extending the useful life of the coated driver 10, for example, relative to the useful life of an uncoated metal driver.

Referring to FIGS. 12 and 20-24, the casing 30 includes a shaft portion 34 adhered to and encasing the shaft face 42 of the core 40. The shaft portion 34 of the casing 30, in an illustrative example, can be of a uniform thickness 20 across the shaft face 42. The shaft portion 34 extends from and is continuous with the other casing portions 32, 36, 38, such that the shaft portion 34 functions to support and promote adhesion of the casing 30 to the core 40, including adhesion to the PS and SS chamfers 52, 54, and to prevent delamination of the casing 30 over time in use. FIGS. 10-25 show additional details of a non-limiting example configuration of the coated driver 10 including elements and features of the coated driver 10, casing 30 and core 40 as described herein.

Figure 9:
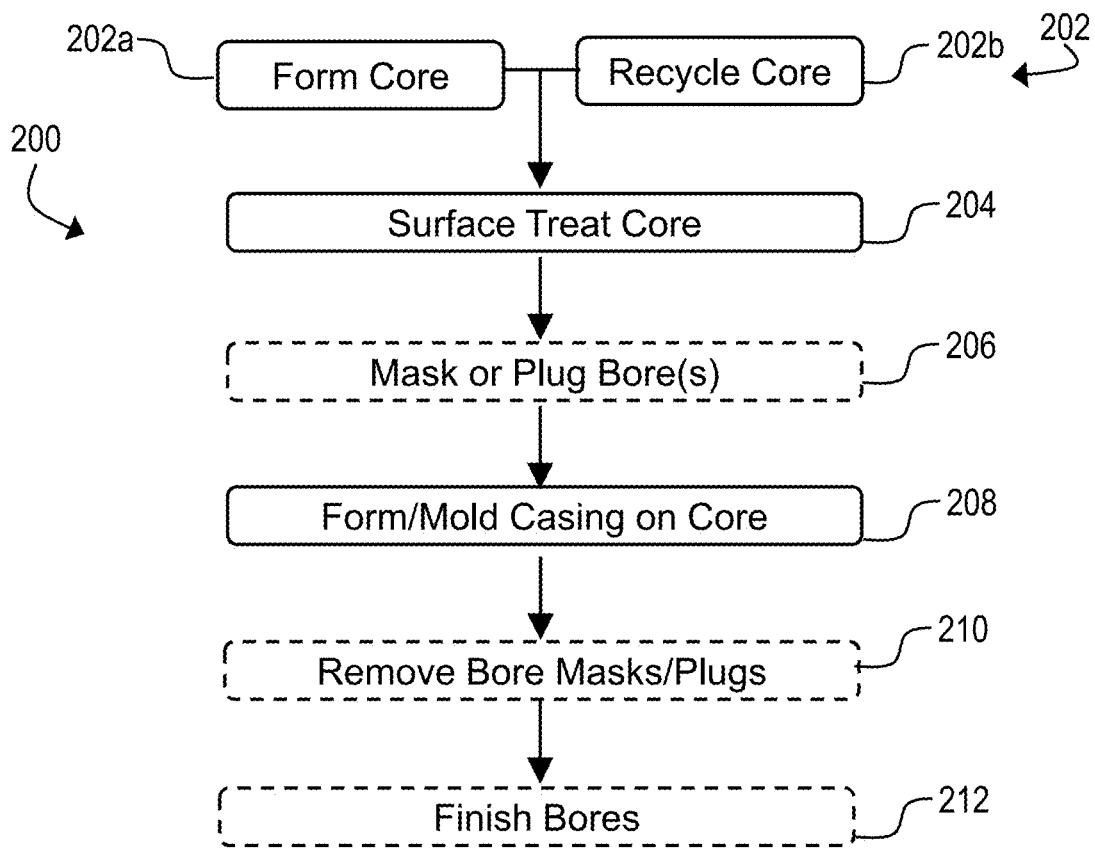
FIG. 9 shows a schematic flow chart showing a method for forming the coated drivers.
Figure 10:
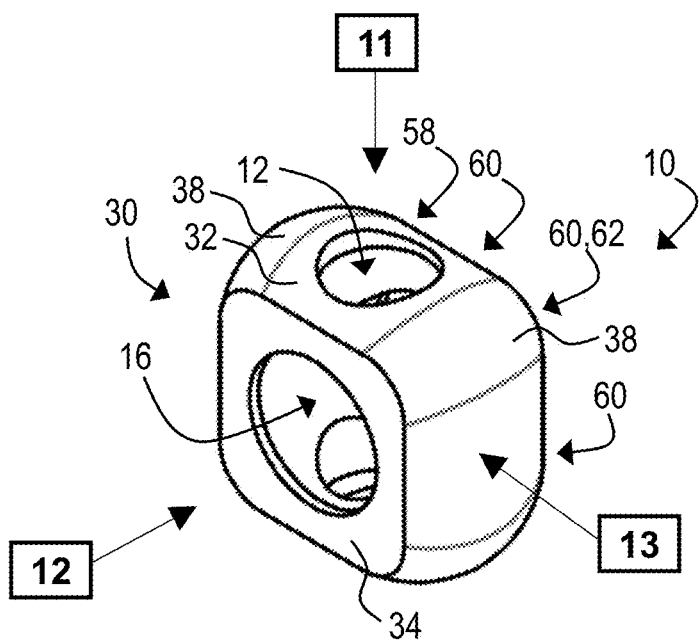
FIG. 10 shows a schematic perspective view of the coated driver of FIG. 2 including a contoured perimeter surface.
Figure 11:
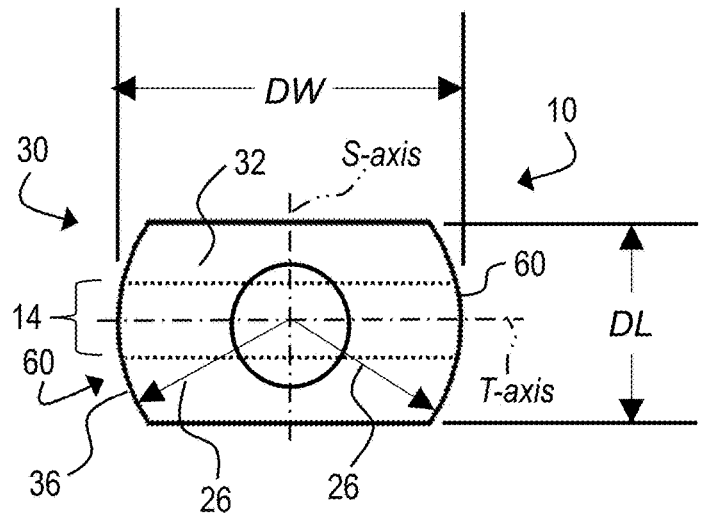
FIG. 11 shows a schematic top end view of the coated driver of FIG. 10 showing casing side portions having a convex contour.

FIG. 9 shows a schematic flow chart showing a method 200 for forming a coated driver 10, including, at step 202, providing a core 40. As shown in FIG. 9, the a new core 40 can be formed at step 202a, for example, by machining or other metal fabrication methods, or alternatively, at step 202b, a reclaimed core 40 can be provided, where the reclaimed core 40 is recycled from a coated driver 10 by removal of the casing 30 to provide the core 40. The coated driver 10 from which the reclaimed core 40 is removed can be, for example, a used coated driver 10, a defective coated driver 10 rejected from the driver molding process, a damaged or otherwise unusable coated driver 10, etc. Step 202b can include inspecting the reclaimed core 40 for compliance with the core specifications, including for example, inspecting the shaft and cross-pin bores 16, 12 for wear and dimensional compliance. At step 204, the core 40 provided at step 202 can be surface treat, for example, to increase the receptivity of the exterior surfaces of the core 40 for adhesion of the casing material to the core material. Step 204 can include for example, cleaning and degreasing the core 40 and/or surface treating the core 40 to texturize or otherwise modify the surface finish of the exterior surfaces of the core 40 to increase adhesion of the casing 30 to the core 40 during forming. At step 206, one or more of the pin bore surface 50 and the shaft bore surface 50 can be masked or plugged to prevent the flow of the casing material onto these surfaces during molding of the casing 30. In a non-limiting example, a removable plug can be inserted to the pin bore surface 50 to mask this surface, and removed after molding at step 210. Other forms of masks, including masking materials, can be applied to the interior bore surfaces 48, 50 at 206 to prevent coating of these surfaces with the casing material and can be removed subsequent to molding of the coated driver 10. In an optional step 212, after demolding the coated driver 10 from the casing mold at 208, one or more of the pin bore 12 and shaft bore 16 can be finished, for example, by surface finishing, polishing, machining, etc., to provide a finished bore 12, 16 in compliance with dimension and surface finish requirements to function as a bearing surface. At step 208, the core 40 received from step 206 is inserted to a mold cavity defining the exterior shape of the coated driver 10. Casing material, which in a non-limiting example can be a urethane based liquid, semi-liquid or resin, is added to the mold cavity and cured to form the coated driver 10. After curing, the coated driver 10 is removed from the mold and proceeds to finishing steps at 212, if required. The exterior surface of the casing 30, including the concave, convex and rounded contours 58, 60, 62 is formed to its final shape during molding. The final surface finish and surface texture of the molded casing 30 is formed during molding, defined by casing material and the surface characteristics of the mold cavity surface. Advantageously, no further processing of the casing 30 is required after molding, such that the final shape and surface finish of the casing 30 is achieved during molding.

In another example, the driver 10, output shaft 110 and cross-pin 106 can be formed integrally, e.g., having a single piece or monolithic structure, such that in this example, the driver 10 does not include a pin bore 12 or shaft bore 16. In this case, the casing 30 can be formed as described herein, using, for example, a mold cavity configured to receive the driver 10 portion of the monolithic structure. In one example, the masking may be used and/or the mold cavity can be configured such that the polymeric material is not applied to the output shaft 110 or the surfaces of the integral cross-pin 106 extending from the pin surfaces 50 of the driver 10. In another example, the casing 30 may extend partially along a length of the output shaft 110 adjacent the shaft surface 48 of the driver 10, and/or the casing 30 can partially or fully encapsulate the surfaces of the integral cross-pin 106 extending from the pin surfaces 50 of the driver 10. Optionally, a finishing operation can be used to remove the casing 30 from the surfaces of one or both of the output shaft 110 and the cross-pin 106.

In another example, the driver 10 and output shaft 110 can be formed integrally, e.g., having a single piece or monolithic structure, such that in this example, the driver 10 does not include a shaft bore 16. The driver 10 can include, as previously described, a pin bore 12 for receiving a cross-pin 106. In one option, the driver 10 is configured as a solid driver 10, e.g., has no pin bore 12. In one option, the driver 10 can be configured to include, for example, a pin bore 12 which extends only partially through the driver 10, to receive a cross-pin 106 that can be, for example, press-fit or otherwise inserted and/or attached to the driver 10 either before or after coating the driver 10 to form the casing 30. In the present example, the casing 30 can be formed as described herein, using, for example, a mold cavity configured to receive the driver 10 portion of the monolithic structure. In one example, masking may be used and/or the mold cavity can be configured such that the polymeric material is not applied to the output shaft 110 or the surfaces of the integral cross-pin 106 extending from the pin surfaces 50 of the driver 10, or if so configured, to a pin bore 12. In another example, the casing 30 may extend partially along a length of the output shaft 110 adjacent the shaft surface 48 of the driver 10, and/or the casing 30 can partially or fully encapsulate the surfaces of an integral cross-pin 106 extending from the pin surfaces 50 of the driver 10, or the pin bore 12, if so configured. Optionally, a finishing operation can be used to remove the casing 30 from the surfaces of one or both of the output shaft 110 and the cross-pin 106 or pin bore 12.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A combination of a socket and a driver for engaging the socket, the socket including a cavity defined by a coupling surface, the driver comprising:
a core including a plurality of exterior core surfaces;
the core made of a metal-based material;
a casing encasing the plurality of exterior casing surfaces;
the casing made of a polymer material;
wherein the driver is configured to engage the socket via the casing in contact with the coupling surface;
wherein:
the plurality of exterior core surfaces includes a plurality of corner chamfers;
the casing includes a plurality of corner portions, each corner portion encasing a respective corner chamfer;
wherein the corner portion of the casing is characterized by:
a rounded contour in a first plane normal to the corner chamfer; and
a convex contour in a second plane normal to the corner chamfer;
wherein the second plane is normal to the first plane.

2. The combination of the socket and the driver of claim 1, the driver further comprising:
a contoured perimeter drive surface defined by the casing;
wherein the driver is configured to engage the socket via the contoured perimeter drive surface in contact with the coupling surface.

3. The combination of the socket and the driver of claim 1, the driver further comprising:
a first driver width when the driver is not engaged with the socket;
a second driver width when the driver is engaged with the socket;
wherein the second driver width is less than the first driver width; and
wherein the second driver width is defined by compression of the casing in contact with the coupling surface.

4. The combination of the socket and the driver of claim 1, wherein the metal-based material is stainless steel.

5. The combination of the socket and the driver of claim 1, wherein the polymer material is a urethane-based material.

6. The combination of the socket and the driver of claim 5, wherein the urethane-based material is a thermoset urethane of about 65 durometer Shore A hardness to about 65 durometer Shore D hardness.

7. The combination of the socket and the driver of claim 1, the driver further comprising:
a bore extending through the core and defined by a bore surface;
wherein the bore surface is not encased by the casing.

8. The combination of the socket and the driver of claim 1, the driver further comprising:
a bore extending through a face of the core and through the casing;
wherein the casing adjacent the bore is characterized by a concave contour relative to the face of the core.

9. A combination of a socket and a driver for engaging the socket, the socket including a cavity defined by a coupling surface, the driver comprising:
a core including a plurality of exterior core surfaces;
the core made of a metal-based material;
a casing encasing the plurality of exterior casing surfaces;
the casing made of a polymer material;
wherein the driver is configured to engage the socket via the casing in contact with the coupling surface;
wherein:
the plurality of exterior core surfaces includes a plurality of faces and a plurality of corner chamfers;
each corner chamfer is intermediate one of the faces and another of the faces;

the casing is adhered to the plurality of faces and the plurality of corner chamfers and is defined by a convex contoured surface relative to the plurality of faces.

10. A method for engaging a driver in combination with a socket, the socket including a cavity defined by a coupling surface, the method comprising:
providing a driver, wherein the driver includes:
a core including a plurality of exterior surfaces;
the core made of a metal-based material;
a casing encasing the plurality of exterior surfaces;
the casing made of a polymer material;
inserting the driver into the cavity such that the casing is in contact with the coupling surface;
wherein:
the plurality of exterior core surfaces includes a plurality of corner chamfers;
the casing includes a plurality of corner portions, each corner portion encasing a respective corner chamfer;
wherein the corner portion of the casing is characterized by:
a rounded contour in a first plane normal to the corner chamfer; and
a convex contour in a second plane normal to the corner chamfer;
wherein the second plane is normal to the first plane.

11. The method of claim 10, the driver further comprising:
a contoured perimeter drive surface defined by the casing;
wherein the driver is configured to engage the socket via the contoured perimeter drive surface in contact with the coupling surface.

12. The method of claim 10, wherein the driver is characterized by:
a first driver width when the driver is not engaged with the socket;
a second driver width when the driver is inserted into the cavity;
the method further comprising:
compressing the casing in contact with the coupling surface such that the second driver width is less than the first driver width.

13. The method of claim 10, wherein the casing in contact with the coupling surface defines a contact interface; and
wherein the contact interface is characterized by zero clearance between the casing and the coupling surface.

14. The method of claim 13, wherein no running noise is generated at the contact interface during transmission of the rotation force.

15. The method of claim 10, further comprising:
applying a rotational force input to the driver;
transmitting the rotation force to the socket via the casing;
wherein transmitting the rotation force is characterized by zero backlash.

16. A method for engaging a driver in combination with a socket, the socket including a cavity defined by a coupling surface, the method comprising:
providing a driver, wherein the driver includes:
a core including a plurality of exterior surfaces;
the core made of a metal-based material;
a casing encasing the plurality of exterior surfaces;
the casing made of a polymer material;
inserting the driver into the cavity such that the casing is in contact with the coupling surface;
the plurality of exterior core surfaces includes a plurality of faces and a plurality of corner chamfers;
each corner chamfer is intermediate one of the faces and another of the faces;
the casing is adhered to the plurality of faces and the plurality of corner chamfers and is defined by a convex contoured surface relative to the plurality of faces.

* * * * *